T. R. ALMOND.
Combined Flask and Packing Box.
No. 162,597.   Patented April 27, 1875.
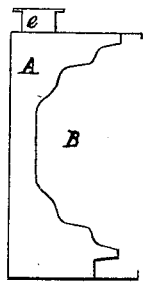
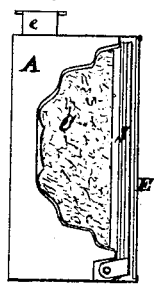
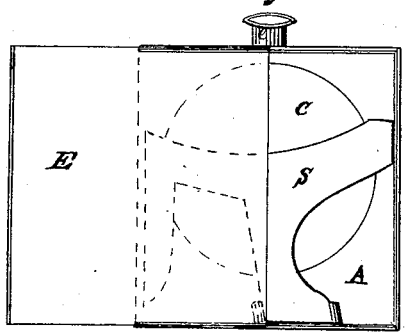

UNITED STATES PATENT OFFICE.

THOMAS R. ALMOND, OF FITCHBURG, MASSACHUSETTS.

IMPROVEMENT IN COMBINED FLASKS AND PACKING-BOXES.

Specification forming part of Letters Patent No. 162,597, dated April 27, 1875; application filed February 23, 1875.

*To all whom it may concern:*

Be it known that I, THOMAS R. ALMOND, of Fitchburg, county of Worcester, State of Massachusetts, have invented a Combined Flask and Box for Containing Cooking-Lamps, Travelers' Lamps, Pocket-Stoves, &c.; and I do hereby declare that the following is a full, clear, and exact description of the same, reference being made to the accompanying drawings, forming part of this specification, in which—

Figure 1 is a vertical cross-section of my combined flask and box, showing the manner of containing such a portable cooking apparatus as the one invented by George Porter Houston, patented August 25, 1874, and shown by the letters C S. Fig. 2 is a vertical cross-section of my combined flask and box, showing the recess or box part B, which I propose to make of a shape suitable to contain any form of nurse-lamp, traveling-lamp, portable cooking apparatus, &c. Fig. 3 is a side view of the same, showing the same form of lamp and support as illustrated in Fig 1.

Similar letters of reference indicate corresponding parts of all the figures.

My invention relates to a more suitable form of packing-box for containing portable cooking apparatus, lamps, &c; said box being so made that the space which is not absolutely occupied by the cooking apparatus, &c., is converted into a reservoir or flask for containing the liquid for replenishing the lamp, thus economizing space, and doing away with the necessity of having a separate flask for this purpose.

In Fig. 2 the chamber A is for containing the liquid, and the recess B for containing the lamp, support, &c., as shown by letters C and S in Fig. 1, C being the lamp part of the apparatus, and S the support. E, in Fig. 1, is the cover or lid for securing the apparatus in place. e represents the neck of the flask.

If the cooking apparatus invented by G. P. Houston be packed in a rectangular box, as is usual, or even a round, flat box, it is evident that there will be some space unoccupied. My invention is to so construct a partition between this unoccupied space and the cooking apparatus as to enable this space to contain alcohol or other liquids without their coming in contact with said apparatus, and yet come so near in contact as to occupy as much of the space as possible; also, to form a convenient opening for withdrawing said apparatus from its compartment, and said liquids from their compartment.

Having thus described my invention, what I claim as new is—

The combined flask and box A B, having two or more compartments, one for containing liquids, and one for containing the apparatus in which said liquid is to be burned, for the purposes herein specified and set forth.

THOS. R. ALMOND.

Witnesses:
J. E. RAYMOND,
T. K. WARE.